(12) United States Patent
Balabine et al.

(10) Patent No.: US 10,164,945 B2
(45) Date of Patent: Dec. 25, 2018

(54) METHOD, APPARATUS, AND COMPUTER-READABLE MEDIUM FOR MASKING DATA

(71) Applicant: Informatica LLC, Redwood City, CA (US)

(72) Inventors: Igor Balabine, Menlo Park, CA (US); Bala Kumaresan, Cupertino, CA (US)

(73) Assignee: Informatica LLC, Redwood City, CA (US)

(*) Notice: Subject to any disclaimer, the term of this patent is extended or adjusted under 35 U.S.C. 154(b) by 53 days.

(21) Appl. No.: 15/161,586

(22) Filed: May 23, 2016

(65) Prior Publication Data

US 2017/0339111 A1  Nov. 23, 2017

(51) Int. Cl.
| | |
|---|---|
| *G06F 21/00* | (2013.01) |
| *H04L 29/06* | (2006.01) |
| *G06F 17/30* | (2006.01) |
| *G06F 21/60* | (2013.01) |

(52) U.S. Cl.
CPC .... *H04L 63/0407* (2013.01); *G06F 17/30569* (2013.01); *G06F 17/30914* (2013.01); *G06F 21/602* (2013.01); *H04L 2209/16* (2013.01)

(58) Field of Classification Search
CPC ............. H04L 63/0407; H04L 2209/16; H04L 29/06823; H04L 29/06829; H04L 29/06836; H04L 29/06843; H04L 63/10; H04L 63/101; H04L 63/102; H04L 63/104; G06F 21/602; G06F 17/30569; G06F 17/30914; G06F 2221/2141
USPC ........................................................ 707/757
See application file for complete search history.

(56) References Cited

U.S. PATENT DOCUMENTS

| | | | |
|---|---|---|---|
| 2006/0248079 A1* | 11/2006 | Braica | G06F 17/30949 |
| 2007/0245119 A1* | 10/2007 | Hoppe | G06F 17/30262 711/216 |
| 2011/0113050 A1* | 5/2011 | Youn | G06F 21/6218 707/757 |

* cited by examiner

*Primary Examiner* — Jeffrey C Pwu
*Assistant Examiner* — Helai Salehi
(74) *Attorney, Agent, or Firm* — Amardeep S. Grewal; Reed Smith LLP

(57) ABSTRACT

An apparatus, computer-readable medium and computer-implemented method for masking data, including applying an irreversible function to a first data element to generate a derivative data element, the first data element being of a first data type and the derivative data element being of a second data type different than the first data type, selecting at least a portion of the derivative data element to serve as a template, generating a masked data element as the result of converting the template from the second data type to the first data type.

54 Claims, 11 Drawing Sheets

Flow chart of masking process

METHOD, APPARATUS, AND COMPUTER-READABLE MEDIUM FOR MASKING DATA

BACKGROUND

Data masking, or redacting, is an important data management technology which prevents access to sensitive data by unauthorized users. Data masking may be applied to stored data at any time, applied when data elements are changed in the persistent data store, or applied to the data while it is in transit wherein data elements are changed while being transmitted to the data consumer.

Data masking techniques include masking data reversibly. Reversible data masking allows recovery of the original data from its masked representation. Data element encryption is an example of a reversible data masking technique. Irreversible data masking, alternatively, transforms the original data element in such way that its original content is wholly or partially lost. For example, one irreversible masking technique extracts a substring of a character string and replaces the remaining characters with arbitrary values.

Traditional data masking is not application friendly. When traditional data masking techniques, such as partial redacting, are applied the applications produce different results than they would with original unmasked data elements. This is especially so when sensitive data is syntactically defined as, for example, a formatted data string such as a driver's license number stored as a data element such as PA12345678, where the first two data element members represent the state of issue and is limited to a set of fifty two-letter state identifiers. In such a case, a masking that results in a data element ZX87654321 received by an application might result in errors during processing if the application expects one of the fifty state identifiers. Or for example, a query on a data set comprising data elements each having the first 12 digits of a credit card number masked (for example xxxx-xxxx-xxxx-1234) may produce different result than a query on an unmasked data set due to possible duplicate credit cards with same last four digits of the account number.

Format preserving encryption technology ("FPE") exhibits certain desirable properties, but has difficulty (or is entirely incapable of) handling data elements having specialized format transform rules, and requires the management of sensitive cryptographic material. For example, a California license plate has a syntactically constructed format such that the first member of the California license plate is a digit between two and seven, the next three members are letters, and the last three members are digits between zero and nine. FPE is incapable of performing a semantically correct transformation of a complex data element such as a California license plate number due to the independence between the data object components. For example, the three letter code cannot be derived from the serial number value and vice versa. Any attempt to adjust the three letter code to achieve semantic correctness of the license plate number leads to the loss of original information during decryption or requires additional information stored in the database which effectively increases the size of the protected data objects in the database.

Accordingly, improvements are needed in systems for masking data while preserving formatting in a deterministic fashion such that each instance of an original data element when transformed by the data masking system under the same conditions results in the same masked data element having the same format.

DETAILED DESCRIPTION

Figure 1:
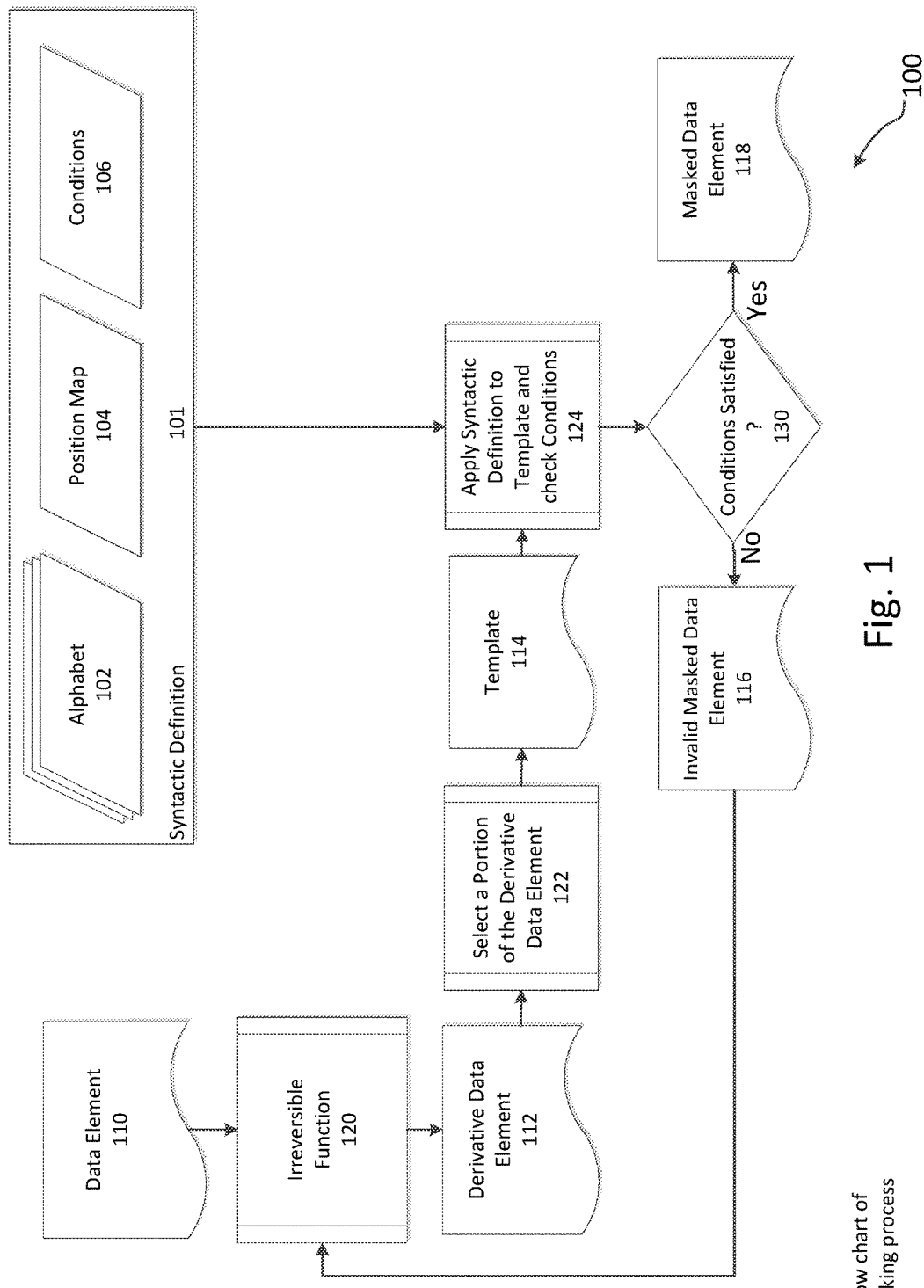
FIG. 1 illustrates a functional flow block diagram for generating a masked data element of an exemplary embodiment.

While methods, apparatuses, and computer-readable media are described herein by way of examples and embodiments, those skilled in the art recognize that methods, apparatuses, and computer-readable media for generating masked data elements utilizing format preserving data masking are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Due to limitations of the traditional masking, an improved technique for providing a masking mechanism for preserving format of the original data element in order to attain robust results from business applications which operate on masked data is desirable. Applicant has discovered methods, apparatus, and computer-readable media for generating masked data elements from original data elements utilizing format preserving data masking. The disclosed methods, media and systems involve data object characterization by means of one or a plurality of attributes, such as data type, data position, one or more basis sets or alphabets, and security parameters. More specifically, the disclosed methods and systems involve processing sensitive data elements to mask sensitive data in a way that is transparent to a user and maintains the robust performance of applications which rely on the masked sensitive data, resulting in a more secure computing environment without negatively impacting the performance of the computing environment, and/or in a more secure computing environment while improving the performance of the computing environment over traditional masking techniques.

Applicant has discovered a novel approach to transforming data elements based on a syntactic characterization of a set of data elements to allow a computer to process the data elements in a different way. A syntactic characterization of a data object, for example a sensitive data object, is a way of describing the semantic format of a set of data elements of a same type, for example an ordered pair comprising values of a different type arranged in a particular ordering such as the California license plate number described above.

The present system utilizes a novel technology for preserving the format of an original data element, for example data element x, having a datatype X. When a masking procedure is applied to obtain a masked data element, for example masked data element x*, such that x, x*∈X, that is data element x and masked data element x* each are of a set of all elements having a data type X. In other words, the various embodiments disclosed herein provide a one way mapping F(x) of an element x to another element x* wherein x and x* have the same syntactically defined format.

The embodiments are not limited to a particular type of data element or a particular type of data type. A data element may take, without limitation, the form of continuous numbers, discontinuous numbers, strings, or symbols, any of which may also be subject to special conditions. A data element is comprised of a number of data element members in an ordered arrangement or a random arrangement. Each data element or data element member may be represented and stored according to any type of encoding such as hexadecimal, octal, decimal, decimal binary, binary numbers, binary numbers corresponding to ASCII values, combinations of decimal numbers stored as binary and letters numbers and symbols stored as ASCII values, or any combination of the above. It will be appreciated that any type of encoding may be used to represent the values comprising a data element as the data element is stored, as the data element is retrieved, as the data is communicated, as the data is processed and as the data is displayed to user. It will also be appreciated that the encoding of data elements may occur during the course of processing by necessity or by design to achieve efficiency in coding or system efficiency in implementation. It will also be appreciated that the various transformations of data during the course of storing, retrieving, processing, communicating etc. will all be handled by the various embodiments of the data masking system disclosed herein.

The embodiments can operate in a dynamic fashion applying data masking data elements as they are retrieved, communicated, or processed without the need to store intermediate values or masked values after they are needed, because each original data element will always result in the same format preserved masked data element under the same conditions. For example conditions can be the user, the users authorization, the users access level, the access level of the requesting application, the authorization level of the application or the machine one which the application is running, the instance of the data element, the database table in which the data element is stored, the database instance, or the particular deployment of the database. It will be appreciated that the types of conditions that might alter the masking of a data element are many and varied and not limited by those listed herein, but chosen by a system designer based on design specifications and costs including processing costs and costs associated with a data elements value among other things.

It will be further appreciated that the embodiments disclosed herein do not require any encryption schemes and are thus free of any restrictions associated with the use of encryption, while at the same time the masking capabilities provided by the data masking capabilities are equal to or exceed those data masking techniques that rely on encryption techniques, such as FPE, without the necessity of managing sensitive cryptographic information. It will also be appreciated that the data masking disclosed herein has significantly more flexibility than a comparable encryption based solution by virtue of unimpeded application of specialized format preserving transformation rules which are not possible with encryption based approaches.

Though the embodiments described herein are not reliant on encryption they are compatible with encrypted data while being independent of the encryption mechanisms in a particular system. Thus, the data masking mechanism disclosed herein allows separating the process of data objects encryption and format preserving presentation. In an exemplary implementation of this invention data objects in a database are encrypted using standard cryptographic methods such as AES encryption in Galois/Counter Mode (GCM) or, without limitation, in any other standard block cipher application mode while format preserving transformation is performed by a remote proxy service.

Though the description involves examples involving masking of a license plate number to demonstrate how a complex syntactically defined data element may be processed according to one or more embodiments, the disclosed methods, systems, and computer-readable medium can also be utilized to mask sensitive data elements of arbitrary data objects, such as bank account numbers, badge numbers, identification numbers, classification numbers, names, credit cards numbers, and the like.

FIG. 1 illustrates an example of generating a masked data element from an original data element by way of a functional flow block diagram of an exemplary embodiment 100. Here the original data element is data element 110. Data element 110 may be comprised of one or more data element members. For example it may be comprised of seven members, or alternatively sixteen members, or an arbitrarily large or small number of members. Each member may be encoded according to a particular data type and arranged in an ordered manner.

First, an irreversible function 120 is applied to data element 110. The irreversible function is a one way function. The irreversible function 120 may be for example a hash function, a deterministic random bits generator ("DRBG"), or a pseudorandom number generator ("PRNG"). The irreversible function can for example be sha-256 or md5. It will be appreciated that any one way function may be used so long as it deterministically arrives at the same output for a given set of inputs, and the particular form of the irreversible function can be selected based on the security requirements of the system.

Irreversible function 120 when applied to data element 110 outputs a derivative data element 112. Depending on which one way function is chosen as the irreversible transform 120, the resulting derivative data element will comprise a fixed number of values encoded in a uniform format that typically will not be of the same data type as data element 110, that is the derivative data element 112 will not be syntactically defined in the same way as data element 110. Derivative data element 112 may, if for example the irreversible transform is md5, comprise for example thirty-two hexadecimal members encoded in binary digits, two hexadecimal digits to an octal, or alternatively it may be encoded as a string of thirty-two members each encoded in ASCII. Alternatively, for example, if the irreversible function 120 is adler32, the derivative data element 112 may be a string of eight values.

If a longer derivative data element 112 is desired, for example when using md5 as the irreversible function 120 resulting in a derivative data element comprising thirty-two member members but a given data element x is of data type X, having elements that comprise fifty data element members, the length in element members of the derivative data element can be increased for example by applying md5 to x and then hashing the result and concatenating the two values. For example the resulting derivative data value may be md5(x)||md5(md5(x)). This process can be reiterated to obtain a derivative data value of at least any desired size.

A template 114 is selected 122 from a portion of the derivative data element 112. This selection of template 114 can be accomplished in any suitable manner. For example for a data element x 110 of length ten, i.e. L(x)=10, the selection of template 114 can be accomplished by selecting the first ten derivative data element members of the derivative data element 112 counting from the left. Alternatively the selection of template 114 can be accomplished by selecting the first ten derivative data element members from the right. Alternatively, the selection of template 114 can be accomplished by selecting the twenty-sixth through thirty-fifth derivative data element members from either the left or right. It will be appreciated that any suitable deterministic algorithm may be used to select a template 114 from derivative data element 112.

A masked data element 118 is then obtained by applying 124 a syntactic definition 101 to template 114. Syntactic definition 101 characterizes all elements of data type X in terms of one or more alphabets 102, a position map 104, and a set of conditions 106. For example, a California license plate issued after 1982, as discussed above, for example x=4SAM123 is syntactically defined by the format mSSSnnn, where m is taken from the alphabet of digits between 2 and 9, SSS is sequence of three characters taken from English alphabet, i.e. set of letters A-Z, and nnn is a three digit sequence of digits from 0 to 9. A special condition for California passenger vehicle license plate number is a gap in the character sequence: license plates 3YAA-3ZYZ series were not issued. Though simplified for brevity the above example thoroughly illustrates characterization of a data object type at hand.

In the case of the California license plate data element x, for example 110, having syntactic compound of the form mSSSnnn is of data type X, such that data element members $x_n$ for $0 \le n \le 6$ are ordered in the form $x_6 x_5 x_4 x_3 x_2 x_1 x_0$ where all elements of data type X comprise members of the form $x_6 \epsilon m$, $x_5 \, x_4 \, x_3 \epsilon SSS$, and $x_2 \, x_1 \, x_0 \epsilon nnn$, where any $x_n$ comprises one octet for $0 \le n \le 6$, for example $x_6 \epsilon m$, comprises one octect of type m, it follows that SSS comprises three octets of type S, and nnn comprises three octets of type n; and for example, each octet is either an ASCII character or an 8 bit described binary number, such that x is a total of 7 octets. Each data element x of data type X comprises member data elements each of which is characterized by one of the following alphabets: $x_5, x_4, x_3 \epsilon S \epsilon A_1 = \{ABCD\ldots XYZ\}$; $x_2$, $x_1$, $x_0 \epsilon n \epsilon A_{x2} = \{0123456789\}$; $x_6 \epsilon m \epsilon A_3 = \{234567\}$. Thus the syntactic compound data element x, for example 110, expressed as data element members $x_6 x_5 x_4 x_3 x_2 x_1 x_0$ of form mSSSnnn, is associated with a positional map that maps each data element member to an alphabet 102 for example positional map 104: $x_6 x_5 x_4 x_3 x_2 x_1 x_0 \epsilon A_3 \, A_{x2} \, A_{x2} \, A_{x2} \, A_1 \, A_1 \, A_1$. The syntactic compound word x of data type X, for example data element 110, additionally is associated with a set of conditions 106 (these special conditions allow for the discontinuities in the data element x), for example conditions 106 are: for $x_6 = 3 \epsilon A_3$, the following condition applies: $x_5 x_4 x_3 <$YAA or $x_5 x_4 x_3 >$ZYZ.

Applying 124 syntactic definition 101 to template 114 generates a masked data element 118 by converting the template to data type X by any suitable method. When one or more conditions 106 must be satisfied for masked data element 118 to conform to the syntactic definition, the conditions are then checked, at step 130, to determine that the conditions are satisfied. If the conditions are not satisfied, the result is an invalid masked data element 116. Irreversible function 120 is then applied to the invalid masked data element 116 and the system again carries out the method described above, and this is repeated until the conditions are satisfied, thus generating masked data element 118.

Figure 2:
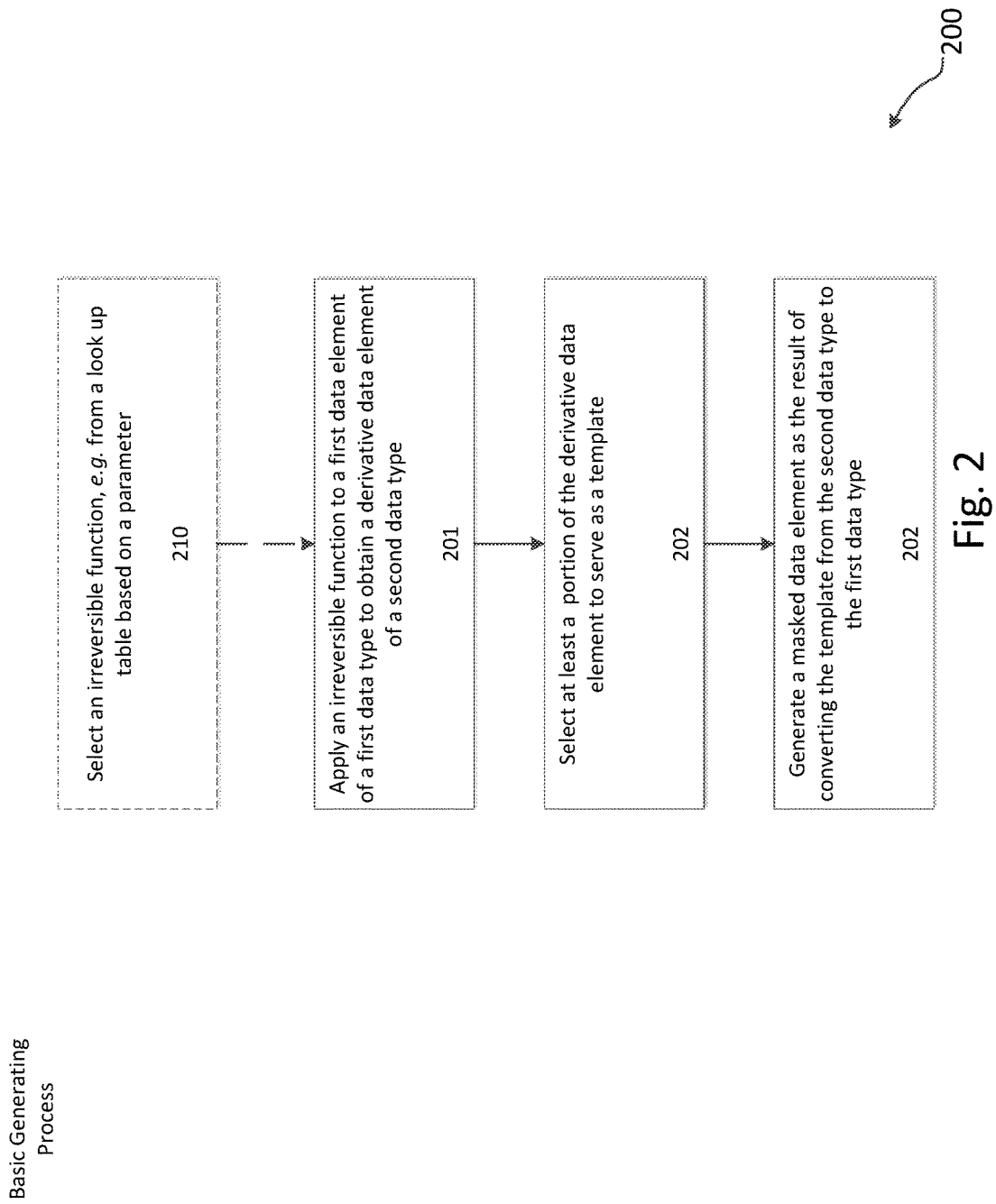
FIG. 2 illustrates a flowchart for a method for generating a masked data element according to an exemplary embodiment.

FIG. 2 illustrates a flowchart 200 for a method for generating a masked data element from a first data object, which may for example be a sensitive data object requested from a database by an application. At step 201, an irreversible function is applied to a first data element of a first data type which irreversibly transforms the first data element into a second data element of a second data type. The first data element is of a first data type. The irreversible function is any one way function which outputs a result from which it is impossible to obtain the original first data element, or for which it is impractically difficult to obtain the original data element. Examples of various irreversible transforms applied at step 201 are a DRBG, a PRNG, and various hash functions, some non-limiting examples being: Adler32, CRC32, Haval, MD2, MD4, MD5, RipemD128, RipemD160, SHA-1, SHA-256, SHA-384, SHA-512, Tiger, and Whirlpool. Additionally, it is appreciated that the irreversible function applied at step 201 can constitute a combination of one or more irreversible functions. It will also be appreciated that the irreversible transform of step 201 may include first augmenting the first data element by applying a unique salt value and subsequently generating a pseudorandom number with the augmented first data element as input seed, or applying a hash function to the augmented first data element, or any combination of these techniques.

Figure 3:
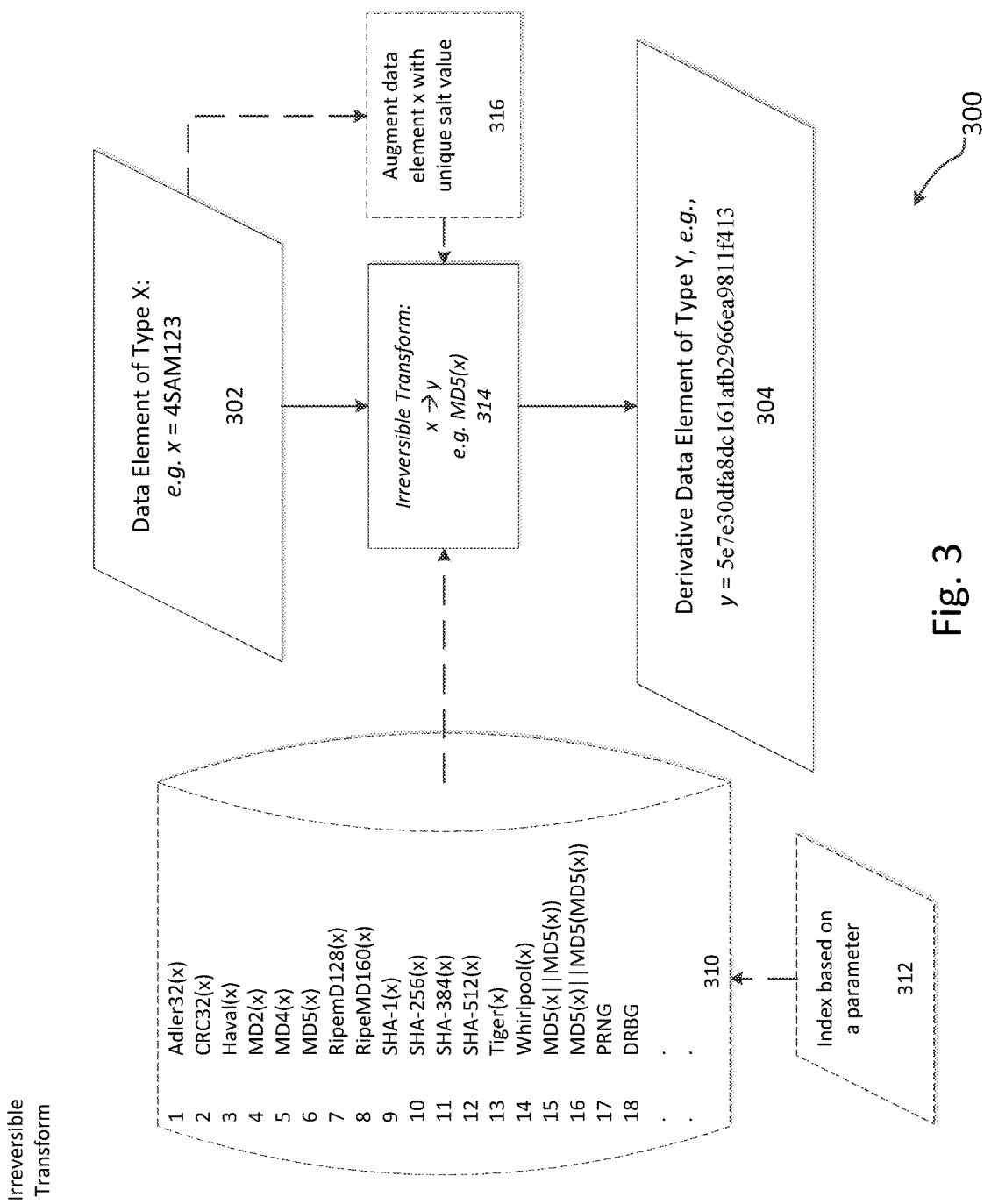
FIG. 3 illustrates a functional flow block diagram for applying an irreversible transform according to an exemplary embodiment.

FIG. 3 illustrates an example of a system's process 300 of applying an irreversible transform 314 to original data element such as data element of type X 302. For exemplary purposes, data element of type X 302 is x=4SAM123, which is of the type California license plate number issued after 1982 (i.e. in this non-limiting example type X denotes of the type California license plate number issued after 1982). For the purposes of illustration, this non-limiting example will be used throughout to demonstrate how an exemplary embodiment generates masked data elements. In the example illustrated in FIG. 3, data element x 302 of type X is transformed 314 to obtain derivative data element y 304 of type Y by applying 314 the hash function md5 to data element x, for example for x=4SAM123, md5(x)= 5e7e30dfa8dc161afb2966ea9811f413 is the derivative data element 304 y.

Referring back to FIG. 2, optionally a step 210 the irreversible transform, or irreversible function, or one way function, may be selected from a lookup table based on one or more parameters. As illustrated in FIG. 3, the transform applied 314 may optionally be selected from a lookup-table 310 containing a listing of various irreversible transforms. This selection from lookup-table 310 may for example be based on one or more parameters 312, where these parameters may for example be associated with conditions such as the user, the user's authorization, the user's access level, the access level of the requesting application, the authorization level of the application or the machine one which the application is running, the instance of the data element, the database table in which the data element is stored, the database instance, or the particular deployment of the database. Alternatively, the irreversible function, or irreversible transform, 314 may be an iterative function, first applying one transform, and then identifying a portion of the transform, for example the first 10 bits, to obtain an index 312 for selecting a second transform from 310. It will be appreciated that the types of conditions that might alter the selection of an irreversible transform 310 in order apply an irreversible transform 314 to an original data element, for example 302, are many and varied and not limited by those listed herein, but chosen by a system designer based on design specifications and costs including processing costs and costs associated with a data elements value among other things.

Optionally, before applying the irreversible transform 314, data element of Type X 302 may be augmented by applying a unique salt value 316. This unique salt value may for non-limiting example be specific to a particular data object instance, a database table, a database, or a particular deployment among other things. For example, it may be the case that for security reasons a designer may want to preclude an unauthorized user or application from "seeing" that the same data entry, for example "John Smith," exists in two separate databases. For example database A may be managed by a first company, and database B might be managed by a second company, and each of database A and database B might have the entry John Smith. It may be desirable that users or applications of each database should be precluded from knowing that each database A and B has a similar entry. Applying a unique salt 316 to the data element 302 before applying the irreversible transform 314 will ensure that derivative data element 304 of each implementation, or deployment, or instance, will be different.

Figure 4:
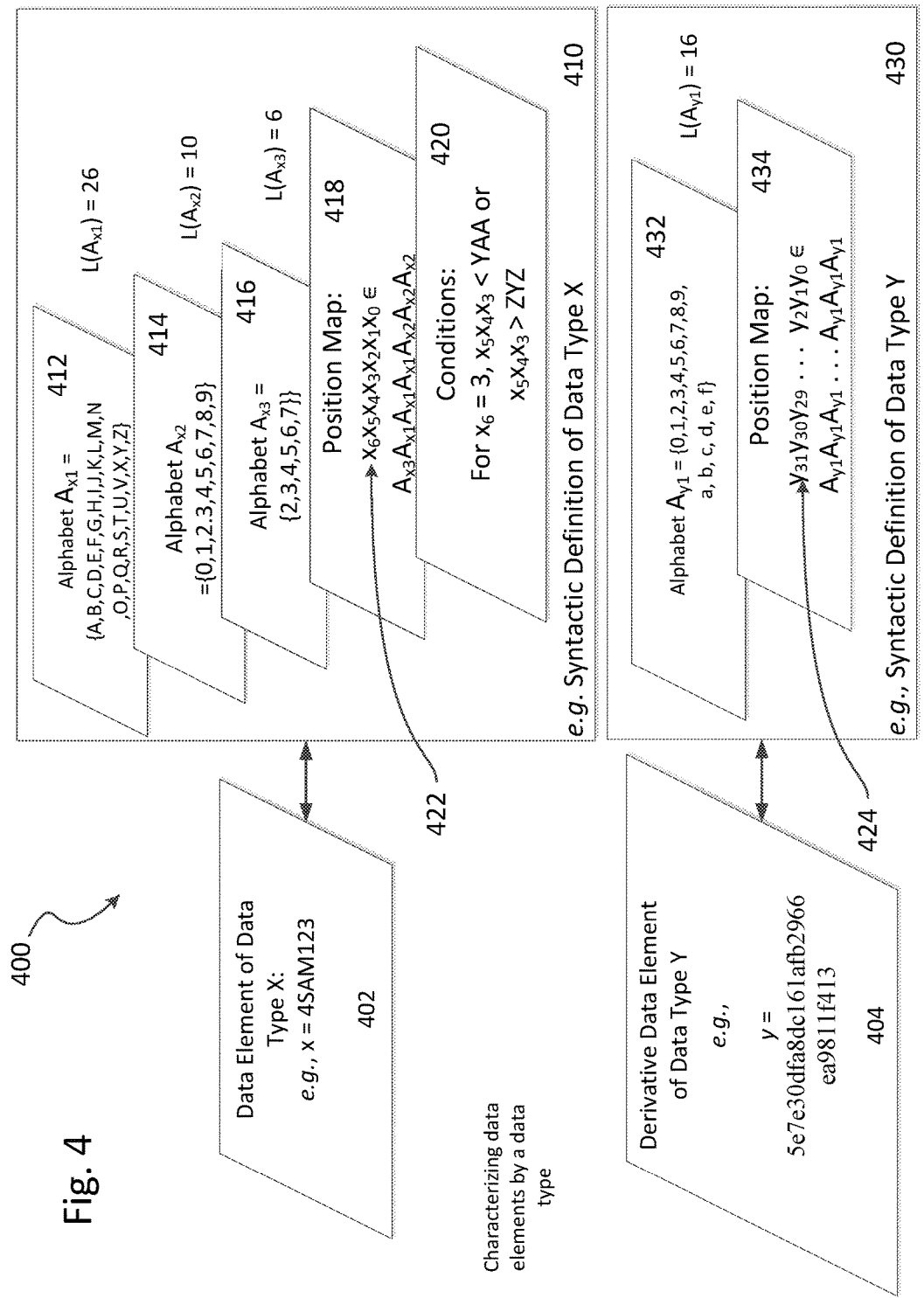
FIG. 4 illustrates characterizing data elements according as syntactically defined data types according to an exemplary embodiment.

FIG. 4 illustrates exemplary data structures 400 for characterizing an exemplary data element of type X 402 according to an exemplary syntactic definition of data type X 410 and for characterizing a second exemplary data element of type Y 404 according to a second exemplary syntactic definition of data type Y 430. The exemplary syntactic definition of data type X 410 describes the data type of a California license plate issued after 1982. This example is chosen for its illustrative purposes, and demonstrates the robust ability for the disclosed embodiments to describe data types. Data type X 410 is characterized by three alphabets $A_{x1}$ 412, $A_{x2}$ 414 and $A_{x3}$ 416; and, a position map 418; and a set of conditions 420. Alphabet $A_{x1}$ 412 is an alphabet comprising the set of values of the English alphabet corresponding to capital letters, for example $A_{x1}=\{A, B, C, D, E, F, G, H, I, J, K, L, M, N, O, P, Q, R, S, T, U, V, W, X, Y, Z\}$. $A_{x1}$ 412 has a length, $L(A_{x1})$ computed as the number of values in the set such that $L(A_{x1})=26$. Alphabet A, 414 comprises the set of all base ten digits, for example $A_{x2}=\{0, 1, 2, 3, 4, 5, 6, 7, 8, 9\}$ and $L(A_{x2})=10$. Alphabet $A_{x3}$ 416 is an alphabet comprising a subset of base ten digits, for example $A_{x3}=\{2, 3, 4, 5, 6, 7\}$ and $L(A_{x3})=6$.

Position map 418 characterizes all elements of data type X in terms of both the number of data element members of a data element, for example x 402, of data type X, and position map 418 characterizes all elements of data type X by specifying which alphabet, for example $A_{x1}$ 412, $A_{x2}$ 414, or $A_{x3}$ 416, each data element member, for example data element member $x_6$ 422, is characterized by. Thus, data element x 402 comprises data element members $x_6 x_5 x_4 x_3 x_2 x_1 x_0$, including seven distinct members where each value $x_n$ is a data element member, such as data element member $x_6$ 422, and the resulting data element x 402 is characterized by ordering each data element member $x_n$ according to the position map, thus to illustrate for x=4SAM123: $x_6=4\epsilon A_{x3}$, $x_5=S\epsilon A_{x1}$, $x_4=A\epsilon A_{x1}$, $x_3=M\epsilon A_{x1}$, $x_2=1\epsilon A_{x2}$, $x_1=2\epsilon A_{x2}$, $x_0=3\epsilon A_{x2}$, as is clearly set forth in position map 418.

Syntactic definition of data type X 410 includes a set of conditions 420. In this illustrative example, the disclosed embodiment data structure 400 includes conditions 420 in order to reflect the fact that California license plate numbers issued after 1982 exclude unissued license plates beginning with the following range of data element members 3YAA-3ZYZ, because California never issued a series of license plates beginning with the values 3YAA-3ZYZ. Thus one or more conditions 420 are required of a data element, for example 402, in order to accurately describe a data element in the set of all California license plates issued since 1982, for example data type X. One way of describing this condition is to express it as for a data element 402 having a data element member $x_6=3\epsilon A_{x3}$, the data element members $x_5 x_4 x_3$ a must be less than the value $YAA\epsilon A_{x1}A_{x1}A_{x1}$, or $x_5 x_4 x_3$ must be greater than the value $ZYZ\epsilon A_{x1}A_{x1}A_{x1}$. It will be appreciated that conditions may be described and imposed in any suitable manner. For example, one or more conditions 420 may be a checksum, or any other discontinuous range of values in an otherwise continuous set, or any condition that generally cannot be expressed in terms of a data element member position and corresponding alphabet.

FIG. 4 additionally characterizes derivative data elements, for example 404, of data type Y by the syntactic definition of data type Y 430. As can be seen, data type Y is a simpler characterization as defined by syntactic definition of data type Y 430. Definition 430 characterizes all elements of data type Y, for example y 404, in terms of one alphabet 432 and a position map, which maps each data element member of data type Y to the single alphabet $A_{y1}$. Thus each of the thirty-two data element members, for example one of which is $y_{31}$ 424, of a data element of data type Y, for example y=5e7e30dfa8dc161afb2966ea9811f413 is mapped to alphabet $A_{y1}$ 432, having a length $L(A_{y1})=16$. In this example alphabet $A_{y1}$ 432 is the set of all hexadecimal numbers 0-f, but it will be appreciated based on these illustrative examples that derivative data elements, for example 404, of data type Y may be characterized by any number of alphabets and a corresponding position based on the irreversible transform applied and the encoding of the result.

Figure 5:
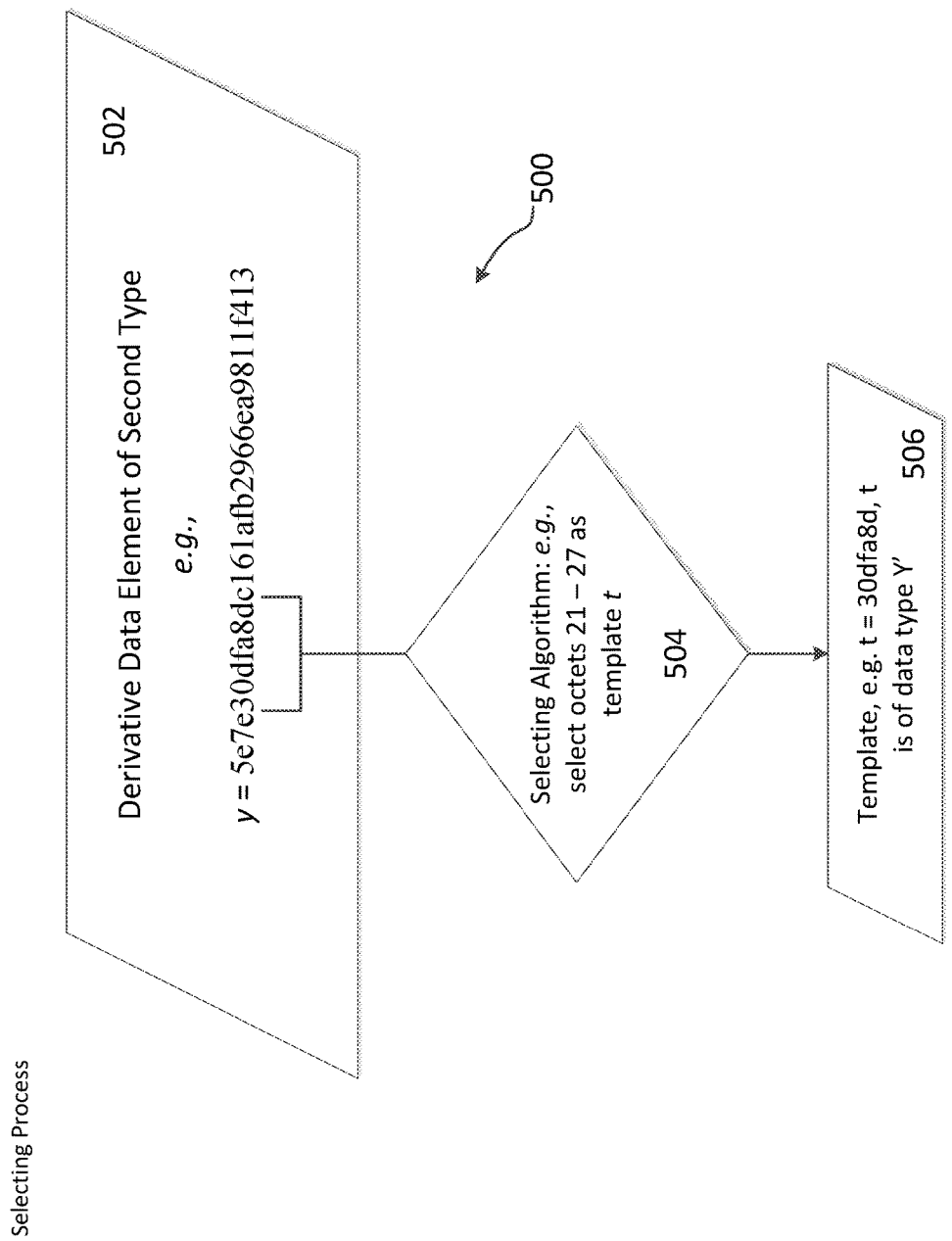
FIG. 5 illustrates a functional flow block diagram for selecting a template from a derivative data element according to an exemplary embodiment.

Referring back to FIG. 2, at step 202, a template is selected to serve as the masking template. This template, for example 506, is selected from a portion of the derivative data element, for example 502, according to various embodiments as is exemplified in the system flow diagram 500 illustrated in FIG. 5. In FIG. 5 it is illustrated by way of example that a selection is made 504 which selects a subset of data element members of derivative data element 502. This selection is made according to an algorithm, for example select octets 21-27 (counting from the right starting with zero as will be appreciated) from derivative data element 502 to generate template t 506, where t is of data type Y' which is characterized by a subset of the position map describing data type Y, for example a subset of position map 434 illustrated in FIG. 4 corresponding to data element members $y_{27}y_{26}y_{25}y_{24}y_{23}y_{22}y_{21} \in A_{y1}$. It will thus be appreciated that the position map of data type Y' corresponds to $y_{27}y_{26}y_{25}y_{24}y_{23}y_{22}y_{21} \in A_{y1}$. The length of the selected portion in terms of the number of data element members selected corresponds to the length of data element members of all elements of data type X. In this illustrative example seven data element members are selected as seven octets from derivative data element 502, for example from y to generate template 506, for example t=30dfa8d, where in each data element member is an octet of binary digits expressing the data element member value for example as binary representing ASCII encoded text. This selection 504 of a portion of derivative data element 502 may alternatively be made according to any suitable algorithm. For example, it may be selected according to the algorithm: select the first seven octets counting from the left. In another suitable algorithm the selection may be made according to: select the first three elements from the left and the first four elements from the right and concatenate the two selections to form a template comprising seven data element members. It will be appreciated that the encoding of the selected data members can be any encoding, and the algorithm may differently select data element members as binary encoding hexadecimal numbers, or decimal numbers. The encoding of derivative data element y may be any suitable encoding chosen by the system designer for design reasons, thus it is left to the designer to choose how the selected portion is selected 504 and what encoding is applied to the selected data element members based on system requirements and design considerations. In the following example various encodings are discussed for ease of illustration, but it will be appreciated that these are for illustrative purposes in order to clearly show how an original data element, for example 402, is masked by generating a masked data element.

Figure 6:
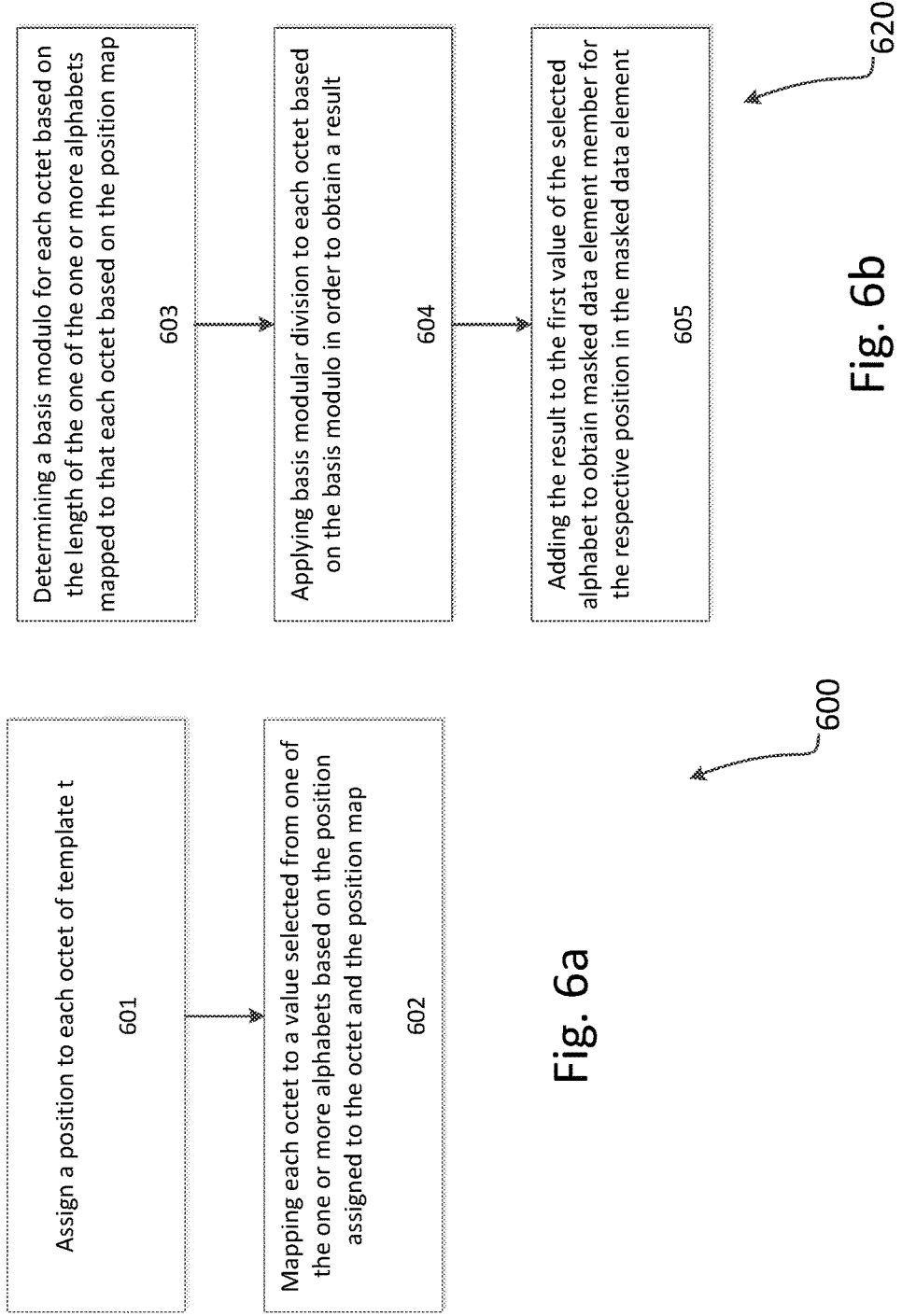
FIG. 6a-b illustrate flow charts for methods for generating intermediate data elements for generating a masked data element according to an exemplary embodiment.

Referring back to FIG. 2, at step 202 an embodiment will generate a masked data element by converting the template from the second data type, for example data type Y', to the first data type, data type X. This data transformation of, for example, template 506 of data type Y', generates a set of ordered data element members that is of data type X based on the values of the individual data element members of template 506. FIG. 6a and FIG. 6b illustrate a flow charts which describe the process of generating a masked data element by converting a template, for example t, from one data type to another. It will be appreciated that these flow charts explicitly show steps which may be simply assumed in the designing or coding process. For example a value 12345 is assumed to have the order shown from left to right; but for illustrative purposes to clearly and particularly demonstrate how the template is converted from one data type to another, various steps are shown for clarity purposes. First, at step 601, a position is assigned to each data element member of template t. Then, at step 602, each element member of template t, characterized by an octet for example, is mapped to a value selected from one of the one or more alphabets based on the position map which describes data elements of the desired data type. This mapping is further described in steps 603, 604, and 605.

Figure 7:
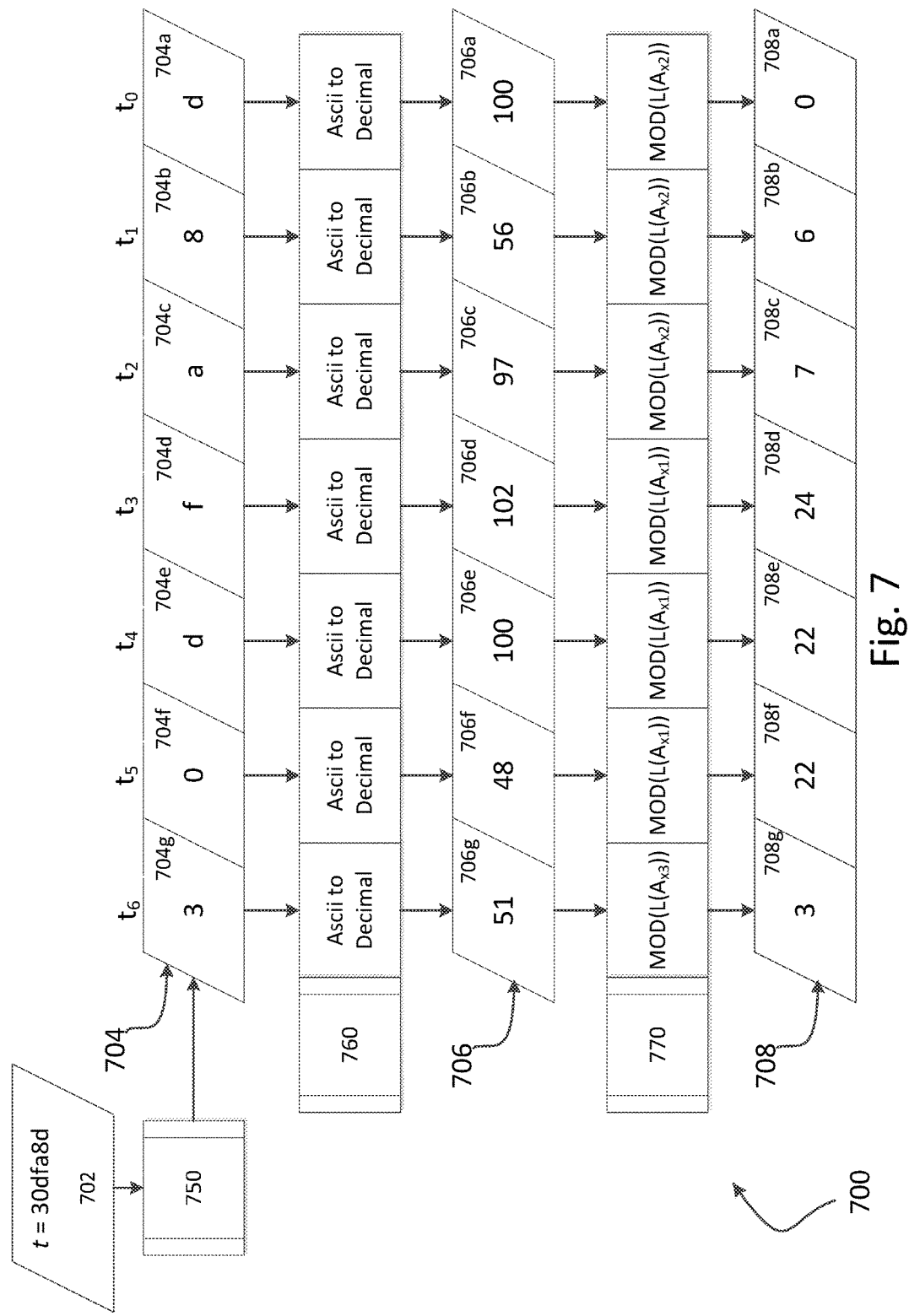
FIG. 7 illustrates a functional flow block diagram for generating intermediate data elements from a template for generating a masked data element according to an exemplary embodiment.

Referring to FIG. 7, which illustrates various intermediate steps in the conversion process attendant to generating a masked data element from a template, for example template 702 corresponding to t=30dfa8d. At subprocess 750, each data element member is assigned to a position 704a-705g, which corresponds to data element members $t_0$-$t_6$. For illustrative purposes, the illustrated example assumes that the data element members $t_0$-$t_6$ assigned to positions 704a-704g are coded in ASCII format. For illustrative purposes, these values may then be operated upon by utilizing the decimal values, or any other basis, of the binary octets underlying the ASCII values, for example, an ASCII '3' corresponds to binary octet '00110011' which corresponds to hexadecimal value '33' which corresponds to octal value '63,' which corresponds to decimal value '51'. In the illustrative example shown in FIG. 7 for ease of demonstration, the values are converted to their corresponding decimal values.

Thus at subprocess 760 the ASCII values are logically converted to their decimal values for performing operations on the values. Thus the representation of data element 704 comprising data element members 704a-704g corresponding to template 702, t=30dfa8d is logically represented at 706 as data element members 706a-706g in logical decimal as '51' '48' '100' '102' '97' '56' '100'. These values need to be mapped to a value within the desired alphabet, for example, 102, 412, 414, or 416, as described by the position map, for example (102 or 418), of the desired data type (corresponding to the data type of the original data element, for example 110, 302, 402, and 702). In this exemplary embodiment, to accomplish this mapping, modulo division is applied to each of the values 706a-706g where the basis modulo is determined by the length of the alphabet, for example 102, 412, 414, or 416, corresponding to the desired data element member as described by the relevant position map, for example 102 or 418.

Referring back to FIG. 6b, the step 602 is elaborated upon in chart 620, steps 603-605. First, a basis modulo is determined for each octet of template based on the length of the alphabet corresponding to each data element member, or octet's, position as described in the relevant position map, for example 102, 412, 414, or 416. Then at step 604 basis modulo division is applied to each octet based on the basis modulo determined for each octet in order to obtain an intermediate result. And then at step 605 the intermediate result is added to the value of the first element of the respective alphabet to obtain a masked data element member for the respective position in the masked data element. Thus, as illustrated by way of example in FIG. 7 and FIG. 8, at subprocess 770, for 706g, modulo division is applied to decimal value '51' using modulo basis=$L(A_{x3})$=6 providing result 708g=3, and, for 706f modulo division is applied to decimal value '48' using modulo basis=$L(A_{x1})$=26 providing result 708f=22. For 706e, modulo division is applied to decimal value '100' using modulo basis=$L(A_{x1})$=26 providing the result 708e=22. For 706d, modulo division is applied to decimal value '102' using modulo basis=$L(A_{x1})$=26 providing result 708d=24. For 706c, modulo division is applied to decimal value '97' using modulo basis=$L(A_{x2})$=10 providing result 708c=7. For 706b, modulo division is applied to decimal value '56' using modulo basis=$L(A_{x2})$=10 providing result 708b=6. Finally for 706a modulo division is applied to decimal value '100' using modulo basis= $L(A_{x2})$=10 providing result 708a=0. This process provides the intermediate result data element 708, 708g=3, 708f=20, 708e=22, 708d=24, 708c=7, 708b=6, 708a=0.

Figure 8:
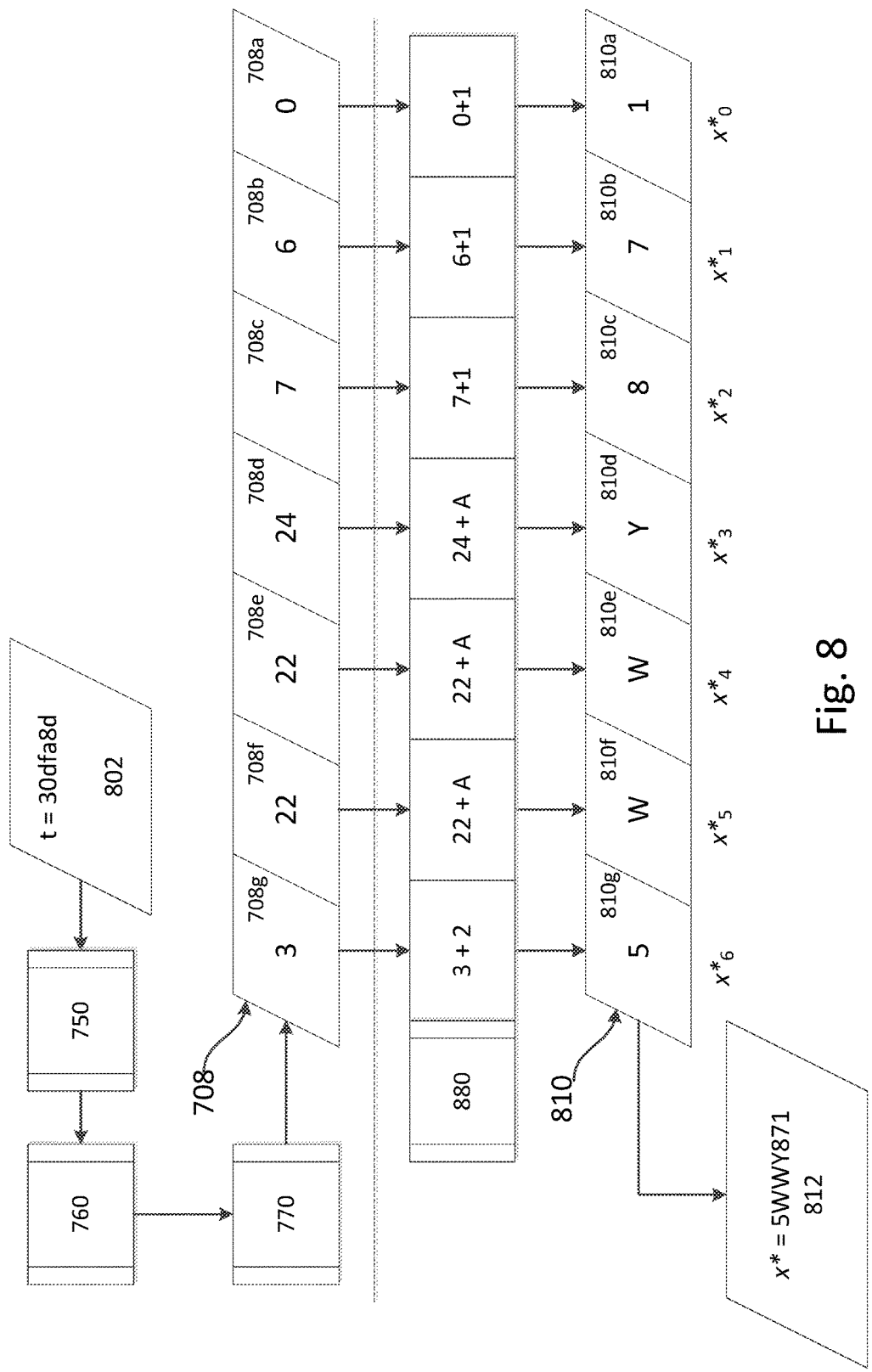
FIG. 8 illustrates a functional flow block diagram for generating a masked data element from a template according to an exemplary embodiment.

From intermediate result data element 708, at subprocess 880, each intermediate data element member 708a-708g is added to the first value of the corresponding alphabet as determined by the position map for the desired data type of the desired masked data element, for example 812. Recall that all data elements of data type X in this exemplary illustration are described by syntactic definition of data type X 410, including position map 418, which maps each element of data type X, for example masked data element x* 812, to a respective alphabet 412, 414, or 416. Thus the data element members of x* 812 are $x^*_6 x^*_5 x^*_4 x^*_3 x^*_2 x^*_1 x^*_0$ which correspond to positions 810a-810g in FIG. 8, are mapped to alphabets such that $x^*_6 x^*_5 x^*_4 x^*_3 x^*_2 x^*_1 x^*_0 \in A_{x3} A_{x1} A_{x1} A_{x1} A_{x2} A_{x2} A_{x2}$. Therefore, subprocess 880 adds intermediate data element member 808g, with a value of 3, to the value of the first element of alphabet $A_{x3}$, and so on for intermediate data element members 808f-808a. This gives resulting masked data element members 810g='5', 810f='W', 810e='W', 810d='Y', 810c='8', 810b='7', 810a='1', and a final masked data element 812 x*=5WWY871. This value holds in light of the applicable illustrative conditions 420 as $x^*_6$ is not equal to 3, and so referring to the functional flow block diagram in FIG. 1 the decision at 130 is satisfied and masked data element 812 is the system output, for example corresponding to 118.

Figure 9:
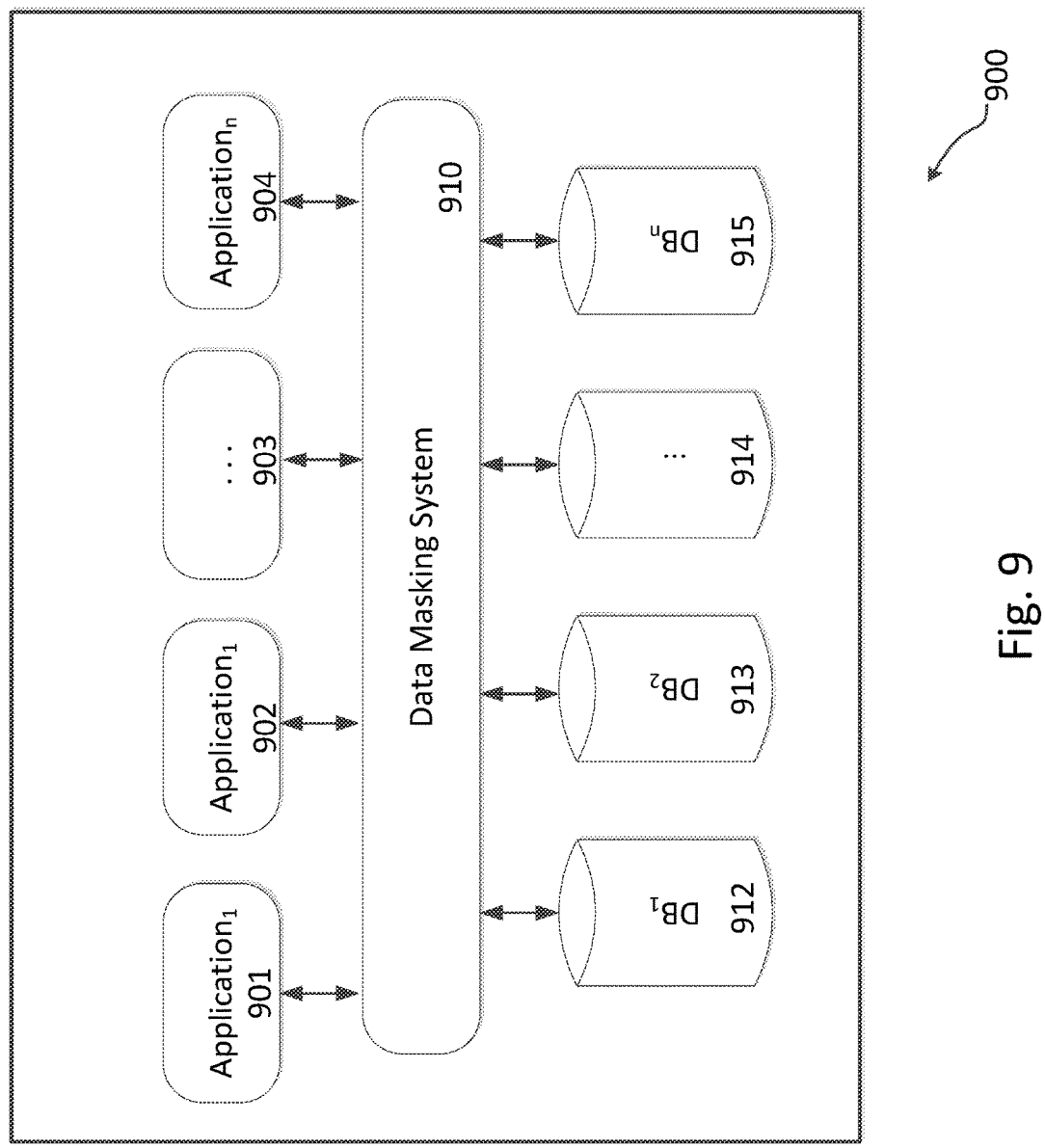
FIG. 9 is a functional block diagram of a system according to an exemplary embodiment.

Referring to FIG. 9, multiple applications 901, 902, 903, 904, may seek to access data stored, for example, in one or more databases 912, 913, 914, 915. In an embodiment, the applications are configured to request data in way that the request is routed through the data masking system 910, alternatively, the data masking system may intercept requests by applications 901, 902, 903, 904 to the databases 912, 913, 914, 915 and handle the requests in a manner that is transparent to the application or a user of the application. In an embodiment, the applications are configured to utilize a designated port for database connections, and the system 910 is configured to listen to those ports to receive incoming data requests. Alternatively the data masking system 910 may be configured as a proxy to which the applications 901, 902, 903, 904 are configured to transmit database requests.

Figure 10:
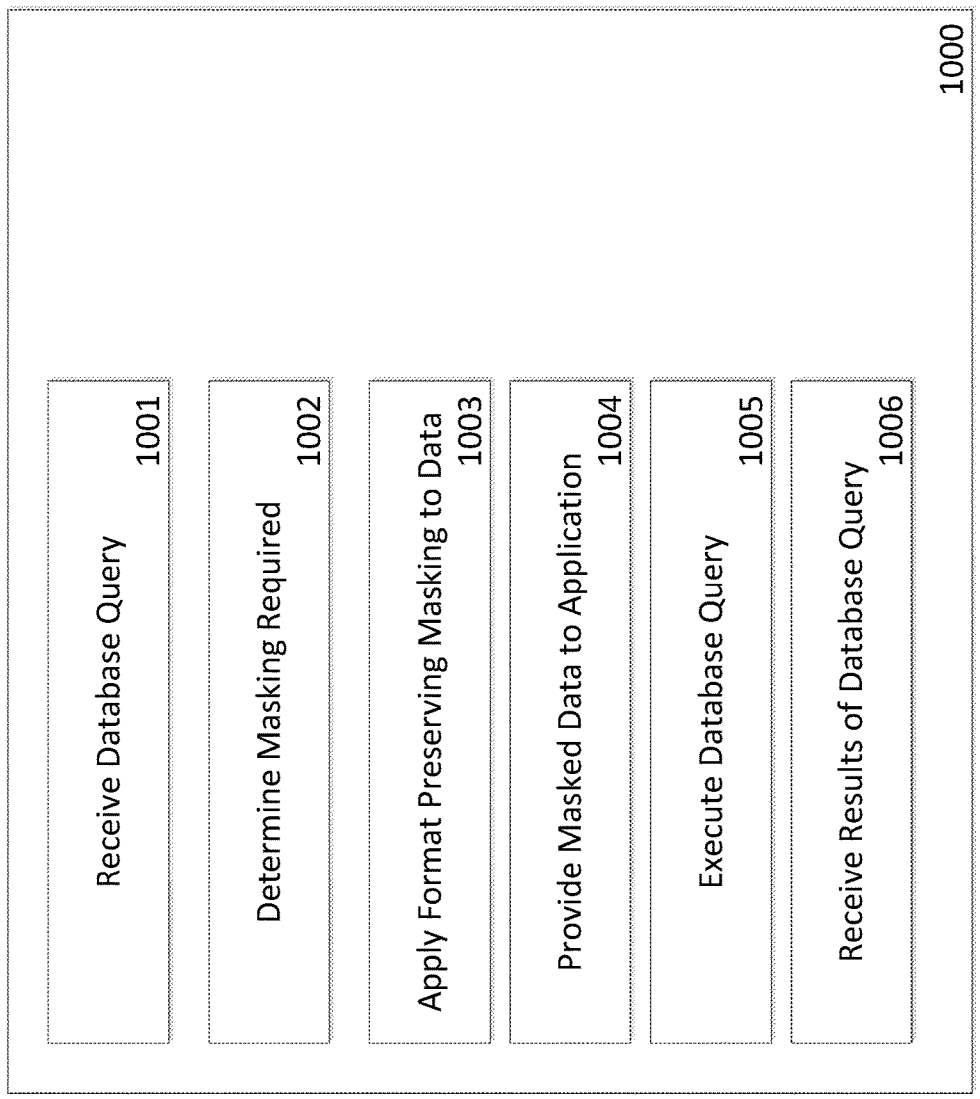
FIG. 10 is a functional block diagram of a system according to an exemplary embodiment.

Referring to FIG. 10, in accordance with an embodiment of the masking system 1000 as, the system 1000, the system 1000 receives a database query 1001 from a request application, for example application 901, and the database query is executed 1005, for example on database 915. When the results of the database query 1006 are received at the system 1000 a determination is made by system 1000 as to what data requested and received requires masking 1002. The system then applies format preserving masking to the received data 1003 before providing the masked data to the application 1005. It will also be appreciated that, alternatively, the decision regarding which data is to be masked 1002 may be made before the data is received 1003 enabling the system 1000 to apply format preserving data masking to the received data 1003 as it is received into system 1000.

Figure 11:
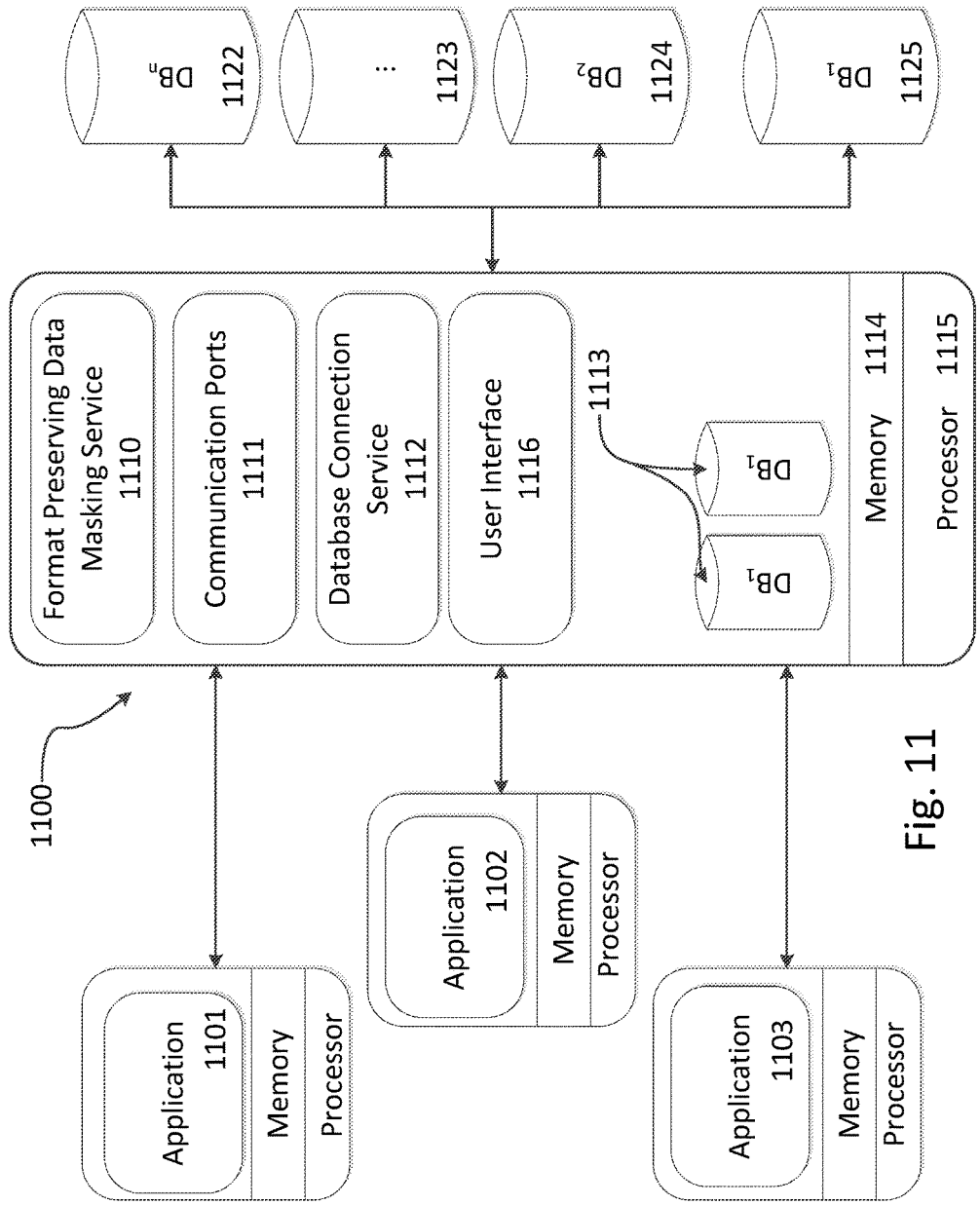
FIG. 11 illustrates an exemplary computing environment that can be used to carry out the method for generating a masked data element from an original data element.

Referring to FIG. 11, illustrates a computing environment including an embodiment 1100 may include a computer having at least a processor 1115 and a memory 1114, a format preserving data masking service 1110, one or more communications ports 1111, a database connection service 1112 (which may include aspects disclosed in the embodiments corresponding to 1001, 1005, 1006), and a user interface 1116. The communications ports 1111 receive queries sent by applications 1101, 1102 or 1103, and send results containing masked data to applications 1101, 1102, or 1103. The database connection service may manage the connections to various external databases 1122, 1123, 1124, 1125, and may also manage database connections to internal databases 1113. The database connection service 1112 receives queries sent to communications ports 1111 and executes those queries on one or more of the databases 1113, 1122, 1123, 1124, and 1125. The database connection service 1112 may communicate with the format preserving data masking service 1110, to inform service 1110 of the data requested, so that service 1110 can determine which data needs masked based on one or more considerations, and which masking should be applied to which requested data also based on one or more considerations. These considerations may for example be associated with conditions such as the user, the user's authorization, the user's access level, the access level of the requesting application, the authorization level of the application or the machine one which the application is running, the instance of the data element, the database table in which the data element is stored, the database instance, or the particular deployment of the database, and may be maintained within the format preserving data masking service 1110 in the form of one or more parameters. The user interface module 1116 may be further provided to allow configuration of the above-described embodiment and entry and editing of masking parameters by a system administrator.

The various embodiments disclose consist of computer software code recorded on computer readable media and executed by one or more processors. Where the embodiments are disclosed in terms of their function in this description it is for the purpose of clarity of description, but need not be discrete devices or code portions, and may be integrated segregated or integrated in any particular manner. Various computer devices may be used to implement the embodiments such as servicers, PCs, mobile devices, laptop computers, tablets, handheld computing devices or various combinations of these devices. Furthermore, the embodiments need not be implemented in software code, but instead may be hardcoded into, for example, FPGAs, ASIC chips, customized processors, Stretch microprocessors, DSP chips, ARM processors, microprocessors, system on a chip based devices and the like.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of the described embodiment shown in software can be implemented in hardware, as discussed above, and vice versa.

In view of the many possible embodiments to which the principles of our invention can be applied, we claim as our invention all such embodiments as can come within the scope and spirit of the following claims and equivalents thereto.

We claim:

1. A method executed by one or more computing devices for masking data, the method comprising:

applying, by at least one of the one or more computing devices, an irreversible function to a first data element to generate a derivative data element, the first data element being of a first data type and the derivative data element being of a second data type different than the first data type, wherein all elements of the first data type comprise a fixed number of element members at a fixed number of positions and wherein the first data type is characterized by a syntactic definition mapping each of the element members to one of one or more alphabets based on position;

selecting, by at least one of the one or more computing devices, a portion of the derivative data element to serve as a template, wherein the portion of the derivative data element selected to serve as the template comprises a fixed number of octets equal to the fixed number of element members of the first data type: and generating, by at least one of the one or more computing devices, a masked data element of the first data type by assigning each octet a position, identifying an alphabet in the one or more alphabets of the syntactic definition corresponding to the assigned position of each octet, and mapping each octet to a value in the corresponding alphabet.

2. The method of claim 1, wherein the syntactic definition comprises the one or more alphabets and a positional map, and wherein the positional map describes a syntactic structure of the first data type in terms of the one or more alphabets.

3. The method of claim 1, wherein the second data type is a binary number or bit string.

4. The method of claim 1, wherein each octet corresponds to either a character or an 8-bit binary value.

5. The method of claim 1, wherein each respective alphabet of the one or more alphabets has a length corresponding to a number of unique values in the respective alphabet, and wherein mapping each octet to a value in the corresponding alphabet comprises, for each octet:

determining a basis modulo based on the length of the corresponding alphabet;

applying basis modular division to the octet based on the basis modulo in order to obtain a result;

adding the result to the first value of the respective alphabet.

6. The method of claim 1, wherein the first data type is further characterized by a set of conditions.

7. The method of claim 1, wherein the irreversible function is selected from a plurality of irreversible functions based at least in part on a lookup table.

8. The method of claim 1, wherein the first data element is in plaintext.

9. The method of claim 1, wherein the first data element is encrypted.

10. The method of claim 1, wherein the template is selected from the derivative data element using a predetermined algorithm.

11. The method of claim 1, wherein the syntactic definition comprises one or more alphabets and a positional map, and wherein the positional map describes a syntactic structure of the first data type in terms of the one or more alphabets and a checksum.

12. The method of claim 1 further comprising, prior to applying the irreversible function to the first data element, augmenting the first data element using a unique salt.

13. The method of claim 2, wherein the positional map describes the syntactic structure of all elements of the first data type by characterizing each element member by one of the one or more alphabets based on the position of the element member.

14. The method of claim 6 further comprising determining, by one or more computing devices, whether the masked data element satisfies the set of conditions; and generating, by at least one of the one or more computing devices, a second masked data element based at least in part on a determination that the masked data element does not satisfy the set of conditions.

15. The method of claim 12, wherein the unique salt is determined based on the instance, the database, the hardware, the requesting application, the user of the requesting application or the deployment.

16. The method of claim 13, wherein each of the one or more alphabets comprises a set of values comprising numbers, letters, or symbols.

17. The method of claim 14, wherein generating a second masked data element comprises:

applying, by at least one of the one or more computing devices, the irreversible function to the masked data element to generate a second derivative data element, the second derivative data element being of a second data type;

selecting, by at least one of the one or more computing devices, at least a portion of the second derivative data element to serve as a second template; and generating, by at least one of the one or more computing devices, the second masked data element as the result of converting the second template from the second data type to the first data type.

18. The method of claim 16, wherein the irreversible function is a hash function, a deterministic random bits generator, or a pseudorandom number generator.

19. An apparatus for masking data, the apparatus comprising: one or more processors; and one or more memories operatively coupled to at least one of the one or more processors and having instructions stored thereon that, when executed by at least one of the one or more processors, cause at least one of the one or more processors to:

apply an irreversible function to a first data element to generate a derivative data element, the first data element being of a first data type and the derivative data element being of a second data type different than the first data type, wherein all elements of the first data type comprise a fixed number of element members at a fixed number of positions and wherein the first data type is characterized by a syntactic definition mapping each of the element members to one of one or more alphabets based on position;

select a portion of the derivative data element to serve as a template, wherein the portion of the derivative data element selected to serve as the template comprises a fixed number of octets equal to the fixed number of element members of the first data type; and generate a masked data element of the first data type by assigning each octet a position, identifying an alphabet in the one or more alphabets of the syntactic definition corresponding to the assigned position of each octet and mapping each octet to a value in the corresponding alphabet.

20. The apparatus of claim 19, wherein the syntactic definition comprises the one or more alphabets and a positional map, and wherein the positional map describes a syntactic structure of the first data type in terms of the one or more alphabets.

21. The apparatus of claim 19, wherein the second data type is a binary number or bit string.

22. The apparatus of claim 19, wherein each octet corresponds to either a character or an 8-bit binary value.

23. The apparatus of claim 19, wherein each respective alphabet of the one or more alphabets has a length corresponding to a number of unique values in the respective alphabet, and wherein mapping each octet to a value in the corresponding alphabet comprises, for each octet:
    determining a basis modulo based on the length of the corresponding alphabet;
    applying basis modular division to the octet based on the basis modulo in order to obtain a result;
    adding the result to the first value of the respective alphabet.

24. The apparatus of claim 19, wherein the first data type is further characterized by a set of conditions.

25. The apparatus of claim 19, wherein the irreversible function is selected from a plurality of irreversible functions based at least in part on a lookup table.

26. The apparatus of claim 19, wherein the first data element is in plaintext.

27. The apparatus of claim 19, wherein the first data element is encrypted.

28. The apparatus of claim 19, wherein the template is selected from the derivative data element using a predetermined algorithm.

29. The apparatus of claim 19, wherein the syntactic definition comprises the one or more alphabets and a positional map, and wherein the positional map describes a syntactic structure of the first data type in terms of the one or more alphabets and a checksum.

30. The apparatus of claim 19 further comprising, prior to applying the irreversible function to the first data element, augmenting the first data element using a unique salt.

31. The apparatus of claim 20, wherein the positional map describes the syntactic structure of all elements of the first data type by characterizing each element member by one of the one or more alphabets based on the position of the element member.

32. The apparatus of claim 24 further comprising instructions which further cause the at least one processor to determine whether the masked data element satisfies the set of conditions; and
    generate a second masked data element based at least in part on a determination that the masked data element does not satisfy the set of conditions.

33. The apparatus of claim 30, wherein the unique salt is determined based on the instance, the database, the hardware, the requesting application, the user of the requesting application or the deployment.

34. The apparatus of claim 31, wherein each of the one or more alphabets comprises a set of values comprising numbers, letters, or symbols.

35. The apparatus of claim 32, wherein causing the at least one processor to generate a second masked data element comprises:
    applying the irreversible function to the masked data element to generate a second derivative data element, the second derivative data element being of a second data type;
    selecting at least a portion of the second derivative data element to serve as a second template; and
    generating the second masked data element as the result of converting the second template from the second data type to the first data type.

36. The apparatus of claim 34, wherein the irreversible function is a hash function, a deterministic random bits generator, or a pseudorandom number generator.

37. At least one non-transitory computer-readable medium storing computer-readable instructions that, when executed by one or more computing devices, cause at least one of the one or more computing devices to:
    apply an irreversible function to a first data element to generate a derivative data element, the first data element being of a first data type and the derivative data element being of a second data type different than the first data type, wherein all elements of the first data type comprise a fixed number of element members at a fixed number of positions and wherein the first data type is characterized by a syntactic definition mapping each of the element members to one of one or more alphabets based on position;
    select a portion of the derivative data element to serve as a template, wherein the portion of the derivative data element selected to serve as the template comprises a fixed number of octets equal to the fixed number of element members of the first data type: and
    generate a masked data element of the first data type by assigning each octet a position, identifying an alphabet in the one or more alphabets of the syntactic definition corresponding to the assigned position of each octet and mapping each octet to a value in the corresponding alphabet.

38. The at least one non-transitory computer-readable medium of claim 37, wherein the syntactic definition comprises the one or more alphabets and a positional map, and wherein the positional map describes a syntactic structure of the first data type in terms of the one or more alphabets.

39. The at least one non-transitory computer-readable medium of claim 37, wherein the second data type is a binary number or bit string.

40. The at least one non-transitory computer-readable medium of claim 37, wherein each octet corresponds to either a character or an 8-bit binary value.

41. The at least one non-transitory computer-readable medium of claim 37, wherein each respective alphabet of the one or more alphabets has a length corresponding to a number of unique values in the respective alphabet, and wherein mapping each octet to a value in the corresponding alphabet selected from one of the one or more alphabets comprises, for each octet:
    determining a basis modulo based on the length of the corresponding respective alphabet;
    applying basis modular division to the octet based on the basis modulo in order to obtain a result;
    adding the result to the first value of the respective alphabet.

42. The at least one non-transitory computer-readable medium of claim 37, wherein the first data type is further characterized by a set of conditions.

43. The at least one non-transitory computer-readable medium of claim 37, wherein the irreversible function is selected from a plurality of irreversible functions based at least in part on a lookup table.

44. The at least one non-transitory computer-readable medium of claim 37, wherein the first data element is in plaintext.

45. The at least one non-transitory computer-readable medium of claim 37, wherein the first data element is encrypted.

46. The at least one non-transitory computer-readable medium of claim 37, wherein the template is selected from the derivative data element using a predetermined algorithm.

47. The at least one non-transitory computer-readable medium of claim 37, wherein the syntactic definition comprises the one or more alphabets and a positional map, and wherein the positional map describes a syntactic structure of the first data type in terms of the one or more alphabets and a checksum.

48. The at least one non-transitory computer-readable medium of claim 37, prior to applying the irreversible function to the first data element, augmenting the first data element using a unique salt.

49. The at least one non-transitory computer-readable medium of claim 38, wherein the positional map describes the syntactic structure of all elements of the first data type by characterizing each element member by one of the one or more alphabets based on the position of the element member.

50. The at least one non-transitory computer-readable medium of claim 42, wherein the computer-readable instructions when executed further cause the computing device to:
   determine whether the masked data element satisfies the set of conditions; and
   generate a second masked data element based at least in part on a determination that the masked data element does not satisfy the set of conditions.

51. The at least one non-transitory computer-readable medium of claim 48, wherein the unique salt is determined based on the instance, the database, the hardware, the requesting application, the user of the requesting application or the deployment.

52. The at least one non-transitory computer-readable medium of claim 49, wherein each of the one or more alphabets comprises a set of values comprising numbers, letters, or symbols.

53. The at least one non-transitory computer-readable medium of claim 50, wherein generating a second masked data element comprises:
   applying the irreversible function to the masked data element to generate a second derivative data element, the second derivative data element being of a second data type;
   selecting at least a portion of the second derivative data element to serve as a second template; and
   generating the second masked data element as the result of converting the second template from the second data type to the first data type.

54. The at least one non-transitory computer-readable medium of claim 52, wherein the irreversible function is a hash function, a deterministic random bits generator, or a pseudorandom number generator.

* * * * *